(12) United States Patent
Koga

(10) Patent No.: US 7,136,965 B2
(45) Date of Patent: Nov. 14, 2006

(54) MICROCOMPUTER

(75) Inventor: Manabu Koga, Kanagawa (JP)

(73) Assignee: NEC Corporation, Tokyo (JP)

( * ) Notice: Subject to any disclaimer, the term of this patent is extended or adjusted under 35 U.S.C. 154(b) by 707 days.

(21) Appl. No.: 09/922,950

(22) Filed: Aug. 7, 2001

(65) Prior Publication Data

US 2002/0029322 A1    Mar. 7, 2002

(30) Foreign Application Priority Data

Aug. 7, 2000    (JP)    ............................ 2000-237996

(51) Int. Cl.
*G06F 12/00* (2006.01)
(52) U.S. Cl. .................................... 711/118
(58) Field of Classification Search ................ 711/165, 711/166, 118
See application file for complete search history.

(56) References Cited

U.S. PATENT DOCUMENTS

| | | | |
|---|---|---|---|
| 6,591,318 B1 * | 7/2003 | Meyer et al. ............... | 710/100 |
| 6,598,137 B1 * | 7/2003 | Yaegawa et al. ............ | 711/165 |
| 6,651,152 B1 * | 11/2003 | Ueki et al. .................. | 711/166 |

FOREIGN PATENT DOCUMENTS

| | | |
|---|---|---|
| JP | 54-161856 | 12/1979 |
| JP | 61-837 | 1/1986 |
| JP | 3-33955 | 2/1991 |
| JP | 4-195540 | 7/1992 |
| JP | 5-28040 | 2/1993 |
| JP | 8-161176 | 6/1996 |
| WO | WO 96/36919 | 11/1996 |

OTHER PUBLICATIONS

Japanese Office Action dated Mar. 7, 2005 (with partial English translation).

* cited by examiner

*Primary Examiner*—Mano Padmanabhan
*Assistant Examiner*—Duc T Doan
(74) *Attorney, Agent, or Firm*—McGinn IP Law Group, PLLC

(57) ABSTRACT

A microcomputer includes (a) a central processing unit, (b) a bus controller electrically connected to the central processing unit through a first bus, (c) a command cache electrically connected to the central processing unit through a second bus, and to the bus controller through a third bus, and (d) a command memory electrically connected to the second bus through a fourth bus, and storing interruption handling routine therein.

18 Claims, 3 Drawing Sheets

FIRST MEMORY MAP

SECOND MEMORY MAP

MICROCOMPUTER

BACKGROUND OF THE INVENTION

1. Field of the Invention

The invention relates to a microcomputer including a cache therein and suitable for real-time control.

2. Description of the Related Art

In real-time control, a microcomputer is required to carry out interruption handling rapidly and in a certain period of time.

FIG. 1 is a block diagram of a conventional microcomputer.

A microcomputer 41 illustrated in FIG. 1 is comprised of a central processing unit (CPU) 42, a bus controller 44 electrically connected to the central processing unit 42 through a data bus 43, a command cache 47 electrically connected to the central processing unit 42 through a command bus 45 and to the bus controller 44 through a connection bus 46, and a memory controller 49 electrically connected to the bus controller 44 through an internal bus 48.

The memory controller 49 is electrically connected further to an external memory 51 through an external bus 50.

Program access to the external memory 51 has been conventionally made at a relatively low rate. However, the microcomputer 41 is successful in making program access to the external memory 51 at a relatively high rate by virtue of the command cache 47.

However, a cache memory is accompanied with a problem that a lot of miss-hits occur, and hence, a cache memory is not suitable to real-time control.

Hereinbelow is explained the reason as the first problem.

If the command cache 47 does not store a command to be executed by the central processing unit 42, the microcomputer 41 has to refill commands from the external memory 51.

For instance, if a data bus of the external bus 50 has a 16-bit width, it would take 16 system clocks at least for the microcomputer 41 to refill commands from the external memory 51. Accordingly, if the command cache 47 does not include interruption handling routine therein, it would be unavoidable for interruption response time to become long.

The second problem is that reduction in miss-hits is reciprocal to a chip size.

That is, if the command cache 47 were designed to have a greater capacity, it would be possible to avoid miss-hits. However, a cache memory occupies a large area due to its structure. Hence, if a cache memory includes the command cache 47 having a great capacity, a chip size would be increased, resulting in an increase in fabrication costs.

In order to have the above-mentioned problems, Japanese Unexamined Patent Publication No. 3-33955 has suggested a cache memory controller in which what is stored in a main memory to which a central processing unit estimates an access is made is transferred to a cache memory operable at a high rate, and data is transmitted to the central processing unit from the cache memory, ensuring that a gap in an operation rate between the central processing unit and the main memory is compensated for. Specifically, the cache memory controller is comprised of first means for storing information about priority to be assigned to cache data, and a controller which makes the first means to store the information, and selects a cache memory to be abandoned. The cache memory controller has a function of causing the controller to refer to the information stored in the first means.

In the suggested cache memory controller, specific data is abandoned as lately as possible by a assigning priority to data stored in the command cache. In order to abandon data once having been stored in the command cache, it would be necessary to carry out cache hit judgment. It would take one system clock to carry out such cache hit judgment. As a result, there is caused a problem that the central processing unit is late accordingly for receiving a command. Furthermore, if the command cache were filled with data having high priority, there would be caused another problem that a hit rate in a program is significantly deteriorated.

Japanese Unexamined Patent Publication No. 61-837 has suggested a program overlay-lord system in which a requested program module is read out of an external file by means of a route module and a program loader, and the program module is overlay-lorded into a user program area in an internal memory. The internal memory includes a buffer area for always storing a program therein, apart from the user program area. When the route module requests the program loader to load a program module having a priority, the program loader loads the designated program module to the user program area from the buffer area. If the designated program module is not stored in the buffer area, the program loader loads the designated program module to the buffer area from the external file, and registers a name of the program module in an index. Thereafter, the program loader loads the program module to the user program area.

Japanese Unexamined Patent Publication No. 4-195640 has suggested an interruption handling system which switches an operation mode of a command executing unit in response to a request of interruption to a data processing unit. Specifically, the interruption handling system is comprised of an interruption arbitration circuit which, if an interruption level highest among interruption requests is higher than an operation level at which the command executing unit operates, outputs the interruption level as a new operation level, a register file having a context which contains a register set used by the command executing unit for executing a program at a predetermined operation level in each of a plurality of frames, a context table in which a flag indicating whether a context is stored in the register file for each of interruption levels defined by a hardware, and a frame number indicative of a frame in which the context is to be stored are registered, a checking circuit which refers to the context table for inspecting the flag and the frame number both associated with a new operation level transmitted from the interruption arbitration circuit and a present operation level transmitted from the command executing unit, and a context indicator which instructs the command executing unit to use a context stored in a frame of the register file identified with the frame number, if the flag indicates that the context is stored in the register file, and instructs an external memory to save/restore the context, if the flag indicates that the context is not stored in the register file.

Japanese Unexamined Patent Publication No. 8-161176 has suggested a method of restarting a microcomputer system including a microprocessor including a command cache, an external memory storing an OS program, a main memory having a first area for storing an OS program and a user area, and a read only memory storing an IPL program. When the microcomputer system is powered on, the IPL program is made to start, and the OS program is loaded into the main memory for starting up the system. If software trouble occurs while the system is in operation, the OS program resets the system, starts the IPL program, initializes the user area, and then, restarts the system. Each of entries of the command cache is provided with a bit for prohibiting exchanging a bit. When the system is powered on, a bit for prohibiting exchanging a certain bit is set, and a line of command for restarting the system is written into the certain entry. While the system is on, the line of command is kept stored in the command cache, However, the above-mentioned Publications fail to solve the above-mentioned problems.

SUMMARY OF THE INVENTION

In view of the above-mentioned problems in the conventional microcomputers, it is an object of the present invention to provide a microcomputer in which a central processing unit is capable of receiving a command at a higher rate, and which avoids reduction in a hit rate in a program.

There is provided a microcomputer including (a) a cache, (b) a central processing unit, the cache and the central processing unit both being fabricated in one chip, and (c) a memory storing commands to be executed by the central processing unit, the memory storing interruption handling routine therein, It is preferable that a program is written into the memory by switching memory maps when the microcomputer is turned on.

For instance, the memory is comprised of a random access memory (RAM).

There is further provided a microcomputer including (a) a central processing unit, (b) a bus controller electrically connected to the central processing unit through a first bus, (c) a command cache electrically connected to the central processing unit through a second bus, and to the bus controller through a third bus, and (d) a command memory electrically connected to the second bus through a fourth bus, and storing interruption handling routine therein.

It is preferable that the microcomputer further includes a memory controller electrically connected to the bus controller through a fifth bus, to the command memory through a sixth bus, and to an external memory through a seventh bus.

It is preferable that the central processing unit, if the command cache stores a command to be executed by the central processing unit, reads the command out of the command cache, and executes the thus read-out command, and if the command cache does not store a command to be executed by the central processing unit, reads a command out of the external memory, and executes the thus read-out command.

It is preferable that the central processing unit reads a command out of the command memory, and executes the interruption handling routine, when interruption occurs.

The microcomputer may further include an external terminal electrically connected to the central processing unit, and wherein a region in which the command memory is to be positioned is designated through the external terminal.

It is preferable that the external terminal can be operated even while the central processing unit is in operation.

The microcomputer may further include an external terminal electrically connected to the central processing unit, and wherein memory maps are switched through the external terminal.

The microcomputer may further include an internal register, and wherein memory maps are switched by the internal register.

The advantages obtained by the aforementioned present invention will be described hereinbelow.

The first advantage is that it is possible to minimize an interruption response time by storing an interruption handling program which is required to make a quick response in real-time control, into the command memory which may be comprised of a random access memory (RAM).

The second advantage is that since a program is written into the command memory by switching memory maps, the command memory could readily and quickly rewrite a program without necessity of specific surroundings The third advantage is that since the command memory can store a program to which many accesses are made, other than a program which is required to make a quick response, it would be possible to reduce a frequency at which the command cache is used, and hence, it would be possible to avoid an increase in a capacity of the command cache which usually occupies a large area.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
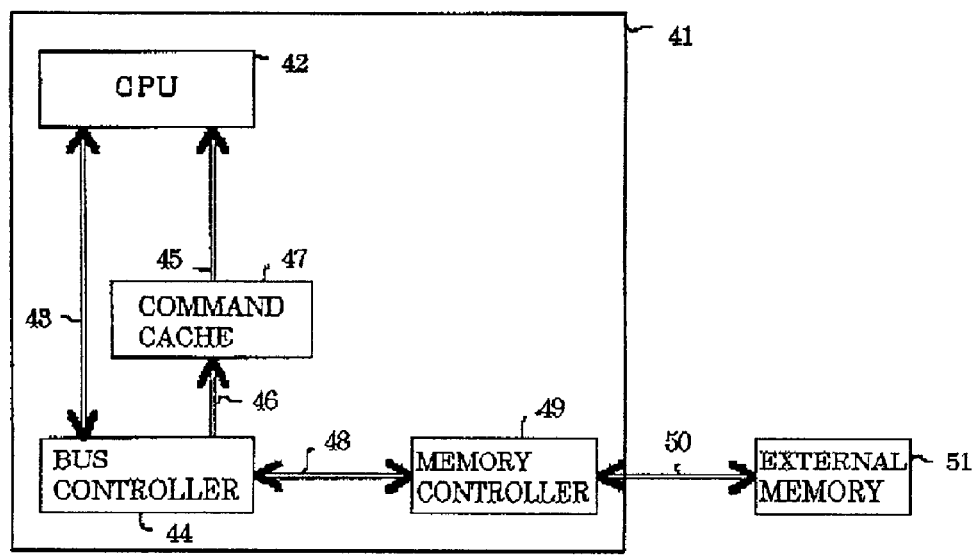
FIG. 1 is a block diagram of a conventional microcomputer.
Figure 2:
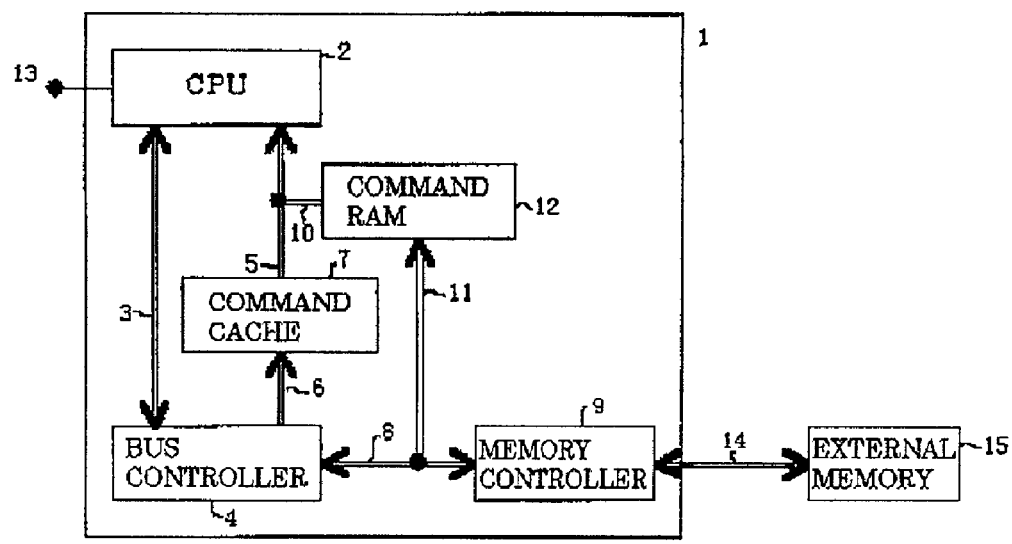
FIG. 2 is a block diagram of a microcomputer in accordance with the first embodiment of the present invention.

FIG. 2 is a block diagram of a microcomputer 1 in accordance with the first embodiment of the present invention.

The microcomputer 1 is comprised of a central processing unit (CPU) 2, a bus controller 4 electrically connected to the CPU 2 through a data bus 3, a command cache 7 electrically connected to the CPU 2 through a command bus 5, and to the bus controller 4 through a first connection bus 6, a memory controller 9 electrically connected to the bus controller 4 through an internal bus 8, a command random access memory (RAM) 12 electrically connected to the command bus 5 through a second connection bus 10, and to the internal bus 8 through a third connection bus 11, and an external terminal 13 electrically connected to the CPU 2.

The memory controller 9 is electrically connected further to an external memory 15 through an external bus 14.

The microcomputer 1 having such a structure as mentioned above is a Harvard architecture microcomputer.

The command RAM 12 stores therein an interruption handling routine which is required to make a quick response. The command RAM 12 is initialized by switching memory maps illustrated in FIG. 3.

Since the command RAM 12 is electrically connected to the command bus 5 through the second connection bus 10, the central processing unit 2 can read a command out of the command RAM 12 in one system clock cycle.

Since the command RAM 12 is electrically connected also to the internal bus 8 through the third connection bus 11, the central processing unit 2 can write a command into the command RAM 12 in one system clock cycle through the data bus 3 and the bus controller 4.

Since the central processing unit 2 is electrically connected to the command cache 7 through the command bus 5, if the command cache 7 stores a command to be executed by the central processing unit 2, the central processing unit 2 can read a command out of the command cache 7 in one system clock cycle.

If the command cache 7 does not store a command to be executed by the central processing unit 2, the command cache 7 carries out a refill operation, specifically, reads commands associated with one line of cache, out of the external memory 15 through the bus controller 4, the internal bus 8, the memory controller 9 and the external bus 14.

The bus controller 4 exchanges signals on the data bus 3 and the command bus 5 and signals on the internal bus 8 to each other.

The memory controller 9 exchanges signals on the internal bus 8 and signals on the external bus 14 to each other.

The central processing unit 2 can read a command out of the external memory 15 in two system clock cycles at least through the command bus 5, the bus controller 4, the internal bus 8, and the memory controller 9, and read data out of and write data into the external memory 15 in two system clock cycles at least through the data bus 3, the bus controller 4, the internal bus 8, and the memory controller 9.

Figure 3:
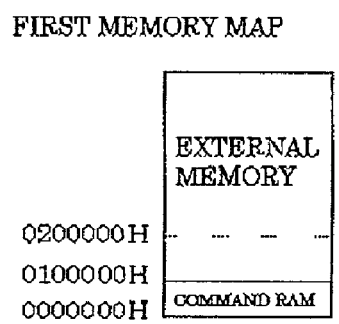
FIG. 3 illustrates what is stored in each of the memory maps.
Figure 3:
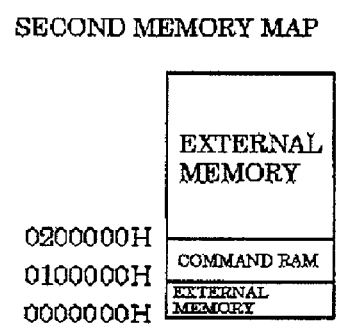

The external terminal 13 electrically connected to the central processing unit 2 designates an area into which the command RAM 12 is to be arranged, as illustrated in FIG. 3. FIG. 3 illustrates an ordinary memory map (hereinafter, referred to as a first memory map) and a memory map for initializing the command RAM 12 (hereinafter, referred to as a second memory map). The command RAM 12 stored in the first memory map is identical to the command RAM 12 stored in the second memory map, through the command RAMs 12 have different addresses from each other.

That is, data to be written at an address of "0100000H" when the second memory map is selected is written at an address of "0000000H" when the first memory map is selected.

Hereinbelow is explained an operation of the microcomputer 1.

When the central processing unit 2 is released from being reset, the central processing unit 2 starts execution of commands from an address of "0000000H". When an interruption occurs, the central processing unit 2 carries out an interruption handling routine designated by an interruption vector table associated with addresses of "0000010H" to "0000480H", defined in accordance with an interruption request source.

An operation of the microcomputer 1 in accordance with the first memory map is explained hereinbelow.

In the first memory map, the command RAM 12 and the external memory 15 are arranged in a memory space, as illustrated in FIG. 3. Specifically, the command RAM 12 is arranged in addresses of "0000000H" to "00FFFFFH", and the external memory 15 is arranged in addresses of "0100000H" and later.

In the first memory map, when the central processing unit 2 is released from being reset, the central processing unit 2 starts execution of commands from an address of "0000000H". Since the address of "0000000H" is assigned to the command Ram 12, the central processing unit 2 reads a command out of the command RAM 12, and executes the thus read-out command.

When ordinary commands are to be executed, the central processing unit 2 executes a program stored in the external memory 15 or the command RAM 12, as follows.

If the command cache 7 stores a command to be executed by the central processing unit 2, that is, if a cache is hit, the central processing unit 2 reads a command out of the command cache 7, and executes the thus read-out command.

If the command cache 7 does not store a command to be executed by the central processing unit 2, the central processing unit 2 reads commands associated with a line of cache, out of the external memory 15, and stores the thus read-out commands into the command cache 7. Thereafter, the central processing unit 2 reads the commands out of the command cache 7, and executes the thus read-out commands.

As an alternative, if the command RAM 12 stores a command to be executed by the central processing unit 2, the central processing unit 2 reads the command out of the command RAM 12, and executes the command.

When an interruption occurs, the central processing unit 2 branches to the interruption handling routine stored in the addresses of "0000000H" to "00FFFFFH", and starts execution of the interruption handling routine. As illustrated in FIG. 3, the command RAM 12 is arranged in the addresses of "0000000H" to "00FFFFFH", and hence, the central processing unit 2 reads a command out of the command RAM 12, and then, executes the interruption handling routine.

In the first memory map, the central processing unit 2 reads a reset routine out of the command RAM 12, and executes the reset routine, immediately after the central processing unit 2 has been reset.

However, since storage of the command RAM 12 is unstable immediately after a power source is turned on, the reset operation may not be executed. Hence, in order to initialize the command RAM 12, there is prepared the second memory map or a memory map for initializing the command RAM, as follows.

Hereinbelow is explained an operation of the microcomputer 1 in accordance with the second map.

In the second memory map, the command RAM 12 and the external memory 15 are arranged in a memory space, as illustrated in FIG. 3. Specifically, the command RAM 12 is arranged in addresses of "0100000H" to "01FFFFFH", and the external memory 15 is arranged in addresses of "0000000H" to "00FFFFFH" and addresses of "0200000H" and later.

In the second memory map, when the central processing unit 2 is released from being reset, the central processing unit 2 starts execution of commands from an address of "0000000H". Since the address of "0000000H" is assigned to the external memory 15, the central processing unit 2 reads a command out of the external memory 15, and executes the thus read-out command.

When the routine for initializing the command RAM 12 is carried out, the microcomputer 1 operates in the same way as a way in which the microcomputer 1 executes an ordinary command stored in the external memory 15 in accordance with the first memory map. That is, the central processing unit 2 executes a program stored in the external memory 15 or the command RAM 12, as mentioned earlier.

Figure 4:
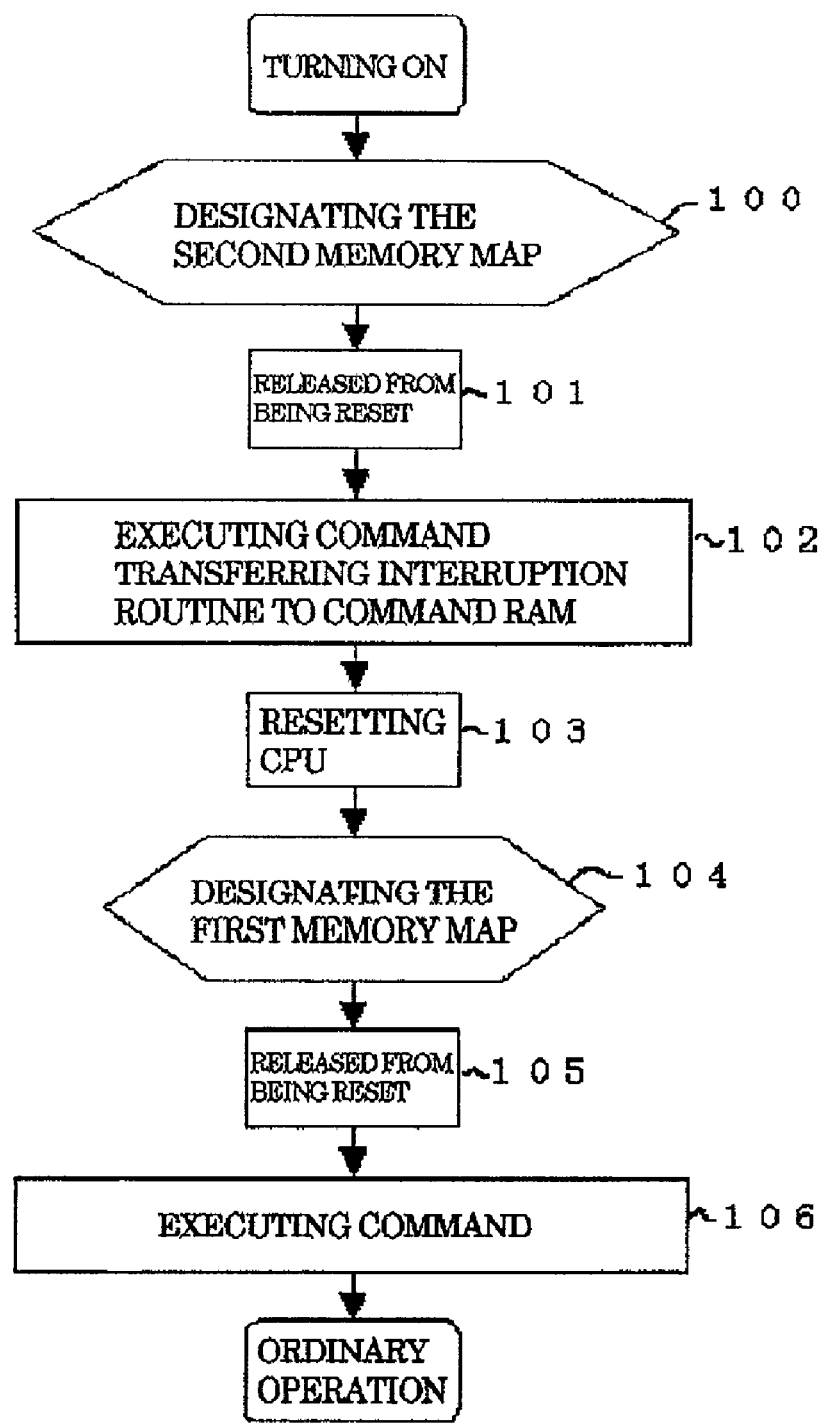
FIG. 4 is a flow chart of a method of initializing the command RAM.

Hereinbelow is explained initialization of the command RAM 12 by means of the second memory map, with reference to FIG. 4.

It is assumed hereinbelow that the following programs and data are stored in the external memory 15.
(a) Reset/interruption vector table
(b) Routine for initialization
(c) Data to be transferred to the command RAM 12 (reset/interruption vector)
(d) Data to be transferred to the command RAM 12 (interruption routine)
(e) Control program/data (at addresses of "0200000H" and later)

Reset and handling of the external terminal 13 are carried out by an external controller (not illustrated) in steps 100, 101, 103, 104 and 105.

After the microcomputer 1 has been turned on, the second memory map is designated through the external terminal 13 in step 100.

Then, the central processing unit 2 is released from being reset, in step 101.

Then, the central processing unit 2 reads a command out of the external memory 15, and executes the thus read-out command, in step 102. Specifically, the above-mentioned programs (a) and (b) are executed in this order, and transfers data (c) and (d) to the addresses of "0100000H" to "0200000H" in which the command RAM 12 is arranged, from the external memory 15, in the initialization routine (b).

After data (c) and (d) has been transferred to the addresses of "0100000H" to "0200000H", the central processing unit 2 is reset again in step 103.

Then, the first memory map is designated through the external terminal 13 in step 104.

Then, the central processing unit 2 is released from being reset, in step 105.

Then, the central processing unit 2 reads a command out of the command RAM 12, and executes the thus read-out command, in step 106. Specifically, the reset/interruption vector (c) having been transferred in step 102 and the control program (e) stored in the external memory 15 are executed in this order.

When interruption occurs, interruption handling is executed in an order of data (c) and (d) stored in the command RAM 12.

As having been explained, no miss-hits occur in the command RAM 12 in the microcomputer 1 in accordance with the first embodiment, unlike the command cache 7. Hence, the microcomputer 1 makes it possible to execute interruption handling rapidly and in a certain period of time, ensuring superior real-time response.

In the cache memory controller suggested in Japanese Unexamined Patent Publication No. 3-33955, it was necessary to carry out cache hit judgment in order to abandon specific data. It took one system clock to carry out such cache hit judgment. In contrast, the command RAM 12 in the microcomputer 1 in accordance with the at embodiment does not abandon data once having been stored therein, it is not necessary to carry out cache hit judgment unlike the above-mentioned cache memory controller. Accordingly, the central processing unit 2 can receive command more rapidly than the cache memory controller suggested in the above-mentioned Japanese Unexamined Patent Publication No. 3-33955.

In addition, the cache memory controller suggested in the above-mentioned Japanese Unexamined Patent Publication No. 3-33955 was accompanied with a problem that if the command cache was filled with data having high priority, a hit rate in a program was reduced. In contrast, since a command is transferred to the central processing unit 2 through the command RAM 12, even if the command cache 7 is filled with data, in the microcomputer 1 in accordance with the first embodiment, the microcomputer 1 solves the problem of reduction in a hit rate.

Hereinbelow is explained a microcomputer in accordance with the second embodiment.

In the microcomputer in accordance with the second embodiment, the external terminal 13 is designed to be able to be handled even while the central processing unit 2 is in operation.

In accordance with the second embodiment, it is no longer necessary to carry out the step 103 in which the central processing unit 2 is reset after initialization in order to handle the external terminal 13, and the step 105 in which the central processing unit 2 is released from being reset. This ensures reduction in a time necessary for starting up the microcomputer 1.

Hereinbelow is explained a microcomputer in accordance with the third embodiment.

In the microcomputer in accordance with the third embodiment, the central processing unit 2 is designed to include an internal register. The memory maps were switched through the use of the external terminal 13 in the above-mentioned first embodiment. In contrast, the memory maps are switched by means of the internal register in the third embodiment.

For instance, the internal register may be arranged to initially designate the second memory map after the central processing unit 2 has been released from being reset. Then, after the initialization of the command RAM 12 has been carried out, the first memory map is designated through the internal register in the same manner as the first embodiment.

In accordance with the third embodiment, it is no longer necessary to handle the external terminal 13 in the steps 101 and 104 both carried out while the central processing unit 2 is being reset, ensuring reduction in a time necessary for starting up the microcomputer 1 and simplification in a structure of the microcomputer 1.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-237996 filed on Aug. 7, 2000 including specification, claims, drawings and summary is incorporated herein by reference in its entirety.

What is claimed is:

1. A microcomputer, comprising:
   a central processing unit;
   a data bus electrically connected to said central processing unit;
   a cache;
   a command bus electrically connected to said cache and said central processing unit and separated from said data bus; and
   a first memory electrically connected to said command bus, said first memory storing an interruption handling routine therein,
   said cache being electrically connected to a second memory.

2. The microcomputer as set forth in claim 1, wherein a program is written into said memory by switching memory maps when said microcomputer is turned on.

3. The microcomputer as set forth in claim 1, wherein said memory comprises a command random access memory.

4. A microcomputer, comprising:
first, second, third, and fourth buses, the second bus being separated from the first bus;
a central processing unit;
a bus controller electrically connected to said central processing unit through said first bus;
a command cache electrically connected to said central processing unit through said second bus and to said bus controller through said third bus; and
a command memory electrically connected to said second bus through said fourth bus, said command memory storing an interruption handling routine therein.

5. The microcomputer as set forth in claim 4, further comprising fifth, sixth, and seventh buses; and a memory controller electrically connected to said bus controller through said fifth bus and to said command memory through said sixth bus, and adapted to be connected to an external memory through said seventh bus.

6. The microcomputer as set forth in claim 5, wherein, when said memory controller is connected to the external memory through said seventh bus, said central processing unit is responsive to said command cache storing a command to be executed by said central processing unit, to read said command out of said command cache and to execute the thus read-out command, and said central processing unit is further responsive to said command cache not storing a command to be executed by said central processing unit, to read a command out of the external memory and to execute the thus read-out command.

7. The microcomputer as set forth in claim 4, wherein said central processing unit is responsive to an interruption, to read a command out of said command memory and to execute the interruption handling routine.

8. A microcomputer, comprising:
first, second, third, and fourth buses;
a central processing unit;
a bus controller electrically connected to said central processing unit through said first bus;
a command cache electrically connected to said central processing unit through said second bus and to said bus controller through said third bus;
a command memory electrically connected to said second bus through said fourth bus, for storing an interruption handling routine therein; and
an external terminal electrically connected to said central processing unit, and wherein a region in which said command memory is to be arranged is designated through said external terminal.

9. The microcomputer as set forth in claim 8, wherein said external terminal can be operated while said central processing unit is in operation.

10. A microcomputer, comprising:
first, second, third, and fourth buses;
a central processing unit;
a bus controller electrically connected to said central processing unit through said first bus;
a command cache electrically connected to said central processing unit through said second bus and to said bus controller through said third bus;
a command memory electrically connected to said second bus through said fourth bus, for storing an interruption handling routine therein; and
an external terminal electrically connected to said central processing unit, and wherein memory maps are switched through said external terminal.

11. The microcomputer as set forth in claim 4, further comprising an internal register, and wherein memory maps are switched by said internal register.

12. The microcomputer as set forth in claim 4, wherein said memory comprises a random access memory.

13. The microcomputer as set forth in claim 1, wherein said cache comprises a command cache.

14. The microcomputer as set forth in claim 1, further comprising a further bus adapted to be connected to an external memory storing a program to be executed by said microcomputer.

15. A microcomputer, comprising:
a central processing unit;
a data bus electrically connected to said central processing unit;
a cache;
a command bus electrically connected to said cache and said central processing unit and separated from said data bus;
a memory electrically connected to said command bus and electrically isolated from said data bus, said memory storing an interruption handling routine therein; and
an external terminal electrically connected to said central processing unit, and wherein a region in which said memory is to be arranged is designated through said external terminal.

16. The microcomputer as set forth in claim 15, wherein said external terminal can be operated while said central processing unit is in operation.

17. A microcomputer, comprising:
a central processing unit;
a data bus electrically connected to said central processing unit;
a cache;
a command bus electrically connected to said cache and said central processing unit and separated from said data bus;
a memory electrically connected to said command bus and electrically isolated from said data bus, said memory storing an interruption handling routine therein; and
an external terminal electrically connected to said central processing unit, and wherein memory maps are switched through said external terminal.

18. The microcomputer as set forth in claim 1, wherein said central processing unit is responsive to an interruption, to read a command out of said memory and to execute the interruption handling routine.

* * * * *

UNITED STATES PATENT AND TRADEMARK OFFICE
CERTIFICATE OF CORRECTION

PATENT NO.       : 7,136,965 B2
APPLICATION NO.  : 09/922950
DATED            : November 14, 2006
INVENTOR(S)      : Manabu Koga It is certified that error appears in the above-identified patent and that said Letters Patent is hereby corrected as shown below:

On Title Page, Item (73) should read Assginee:

NEC Electronics Corporation, Kawasaki, Kanagawa (JP)

Signed and Sealed this

Thirteenth Day of March, 2007

JON W. DUDAS
*Director of the United States Patent and Trademark Office*